United States Patent [19]

Sulzbach et al.

[11] Patent Number: 5,330,647
[45] Date of Patent: Jul. 19, 1994

[54] FILTER DEVICE FOR SEPARATING COARSE COMPONENTS FROM LIQUID COMPONENTS

[75] Inventors: Hans-Michael Sulzbach, Königswinter; Ferdinand Althausen, Neunkirchen; Reiner Raffel, Siegburg, all of Fed. Rep. of Germany

[73] Assignee: Maschinenfabrik Hennecke GmbH, Leverkusen, Fed. Rep. of Germany

[21] Appl. No.: 868,407

[22] Filed: Apr. 14, 1992

[30] Foreign Application Priority Data

Apr. 19, 1991 [DE] Fed. Rep. of Germany ....... 4112787

[51] Int. Cl.⁵ .............................................. B01D 35/02
[52] U.S. Cl. .................... 210/383; 210/433.1; 210/488
[58] Field of Search ............ 210/391, 396, 397, 433.1, 210/488, 414, 408, 359, 383

[56] References Cited

FOREIGN PATENT DOCUMENTS

| 0072149 | 2/1983 | European Pat. Off. . |
| 3716707 | 12/1988 | Fed. Rep. of Germany . |
| 1230563 | 5/1971 | United Kingdom . |
| 2008964 | 6/1979 | United Kingdom . |

Primary Examiner—Frank Spear
Attorney, Agent, or Firm—Joseph C. Gil

[57] ABSTRACT

The invention is directed to a filter device for the removal of coarse components from a liquid component used in the manufacture of plastic materials. The filter device has a hollow housing in which a rotor is mounted. The rotor is provided with agitator blades which comb out any dead-flow zones.

8 Claims, 3 Drawing Sheets

FILTER DEVICE FOR SEPARATING COARSE COMPONENTS FROM LIQUID COMPONENTS

BACKGROUND OF THE INVENTION

The present invention relates to a filter device for separating coarse components from liquid components which contain powdered, fine-grain or fibrous solid particles, and which are used for the manufacture of plastic materials.

In the manufacture of plastic materials containing fillers from melts or free-flowing reaction components, the solid particles are added to the melt or to one of the reaction components, as for example in the manufacture of polyurethane reaction plastic materials. The fillers frequently contain coarse components in the form of agglomerates or impurities. As the plastic melt or reaction component charged with filler generally has to be extruded through nozzles in further processing, there is a risk of blockage of these nozzles due to the coarse particles. Sieve filters have been connected upstream, but these filters also became blocked very quickly.

The object of the present invention was to create a filter device which, without clogging up itself, separates coarse components.

DESCRIPTION OF THE INVENTION

Figure 1:
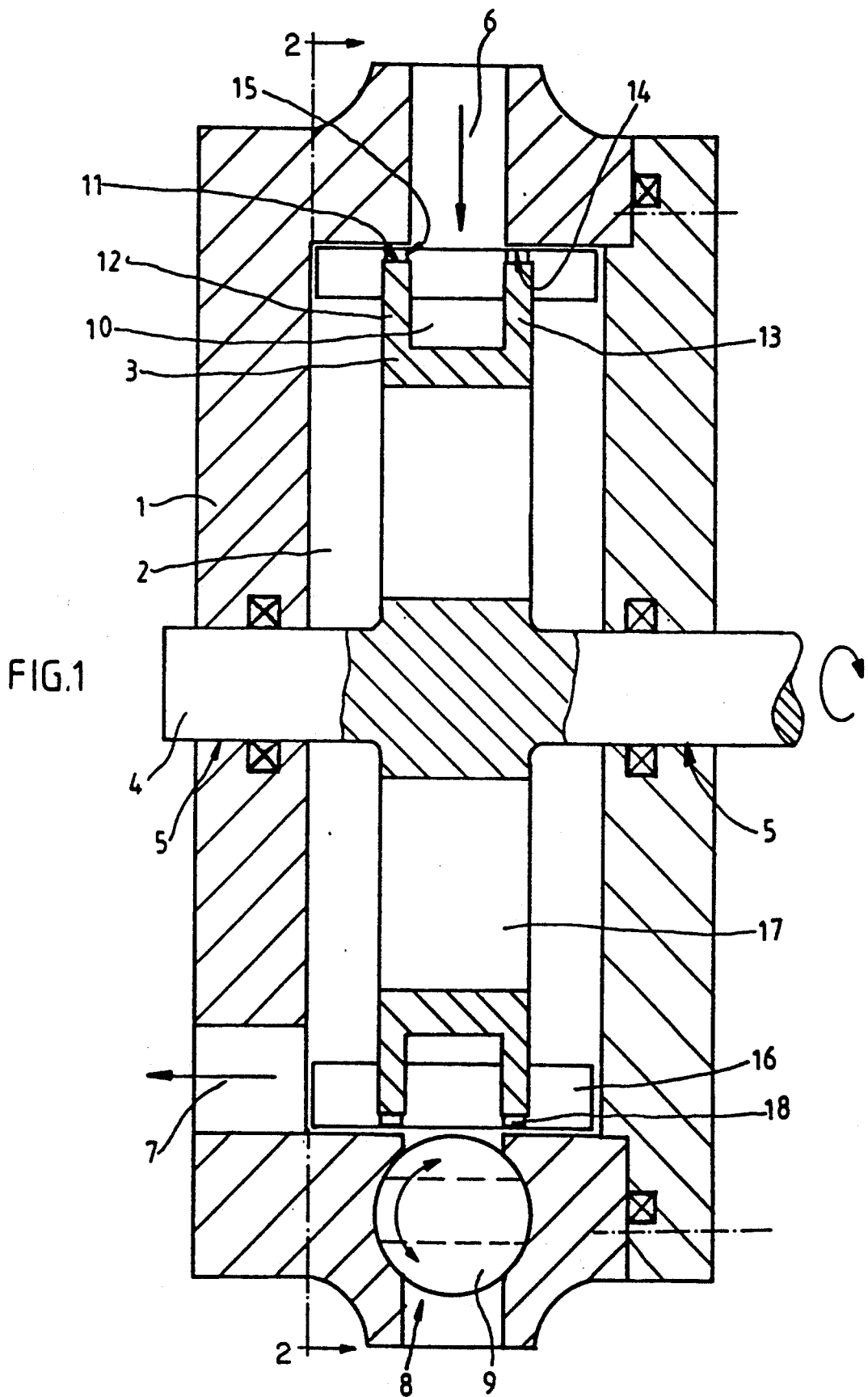
FIG. 1 represents a cross-sectional view of a device of the present invention.

The above object is achieved by the device of the present invention. More particularly, the device comprises a housing with a rotor (or rotating element) mounted therein. The circumferential face forms of the rotor forms a filter gap with the inner circumferential face of the housing. The rotor is equipped with agitator blades which comb through the dead-flow spaces of the housing. The housing is provided with an inlet in the region of its inner circumferential face, a sump outlet spaced therefrom, and an outlet on the side thereof.

This means that the coarse components collect on the inlet side and can be removed from time to time by opening a stop valve in the sump outlet. The agitator blades ensure that filler cannot be deposited anywhere. The width of the filter gap depends on the grain size of the filler. It must be slightly larger than the grain size in order that the filter gap does not become blocked. On the other hand, the width of the filter gap determines the minimum size of the coarse components to be separated.

Preferably the circumferential face of the rotor defining the filter gap is provided with teeth. In this case, the teeth extend very close to the inner circumferential face of the housing, so that the liquid charged with filler has to flow through the gaps in the teeth. These teeth will prevent long-fiber coarse components from passing through the filter gap.

It is particularly advantageous if the rotor has a circumferential groove into which the inlet opens and from which the sump outlet opens out. Since in this case the coarse components to be separated remain between two continuous side walls, the risk of any deposit on the walls is even smaller.

According to a further particular embodiment, the rotor is provided with axial holes. This configuration is particularly practical if a filter gap is present on either side of the circumferential groove and an outlet is only provided on one side, for then the filtered liquid can flow through these holes in the direction of the outlet.

It is particularly advantageous to mount the shaft of the rotor horizontally and to provide the inlet above and the sump outlet below the housing. This improves separation and removal of the separated coarse components, because when the stop valve is opened, the sump can flow downwards due to gravity. With a vertical shaft mounting, the sump would not flow away completely and it would be necessary to flush the sump out in an emergency. The more obliquely the shaft is mounted, the better the sump drains.

Preferably, the inner circumferential face of the housing is formed by an exchangeable spacer ring. This embodiment has the advantage that the spacer ring can be exchanged for another of the same outer diameter but a different inner diameter in order to be able to adapt the width of the filter gap to the grain size of the respective filler. Obviously, in this embodiment the housing must be easy to open so that there is no difficulty in changing the spacer ring. For this purpose, one end face of the housing may, for example, be formed as a lid which can be screwed into place in a sealing-tight manner.

Preferably, the agitator blades are also formed as exchangeable parts.

The invention will now be explained in more detail below with references to the drawings in which the new filter device is shown purely diagrammatically in two embodiments.

Figure 2:
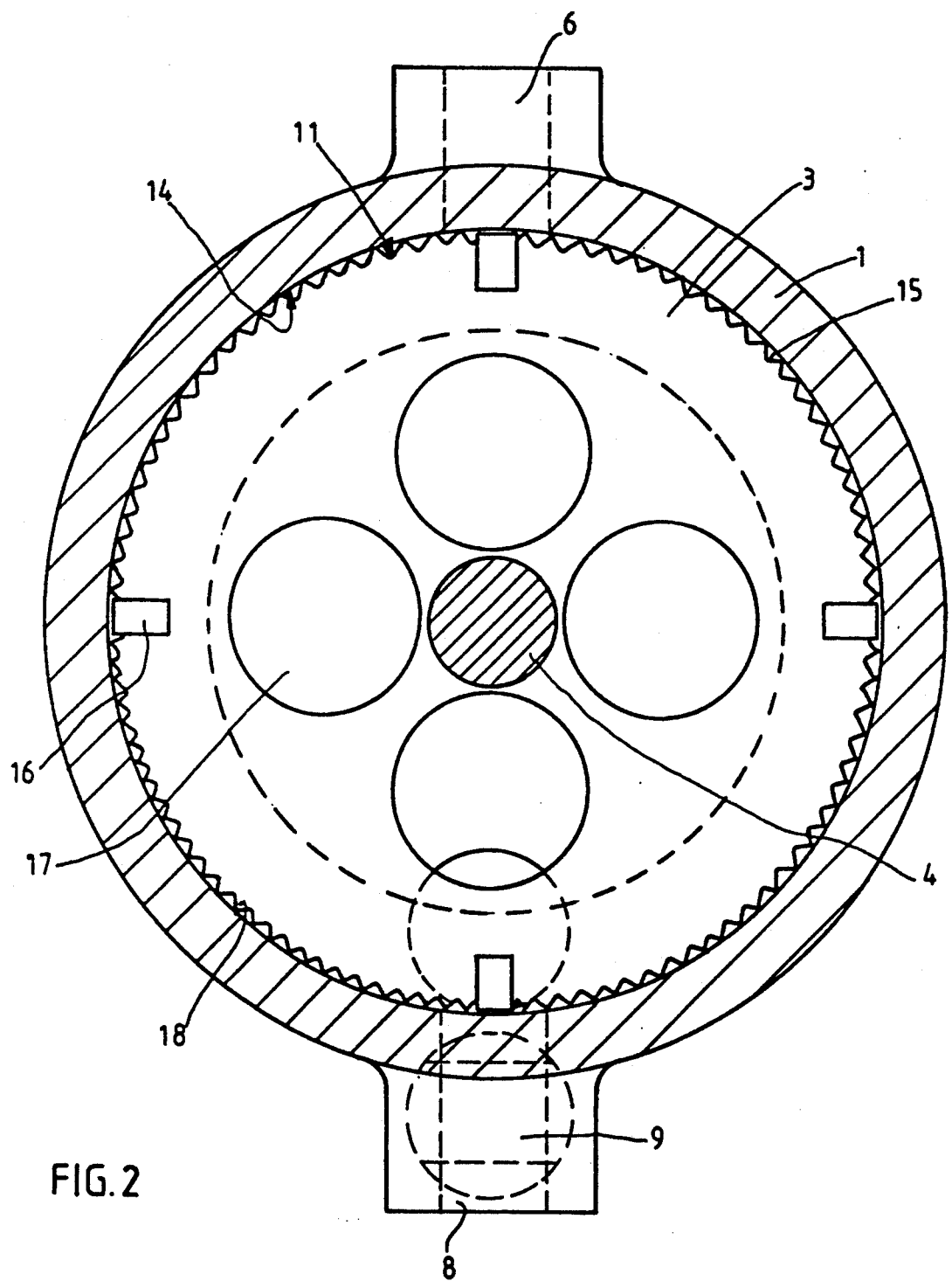
FIG. 2 represents a sectional view along the line A-B of FIG. 1.

In FIGS. 1 and 2, a housing 1 encloses a chamber 2, in which a rotor 3 (or rotating element) with a horizontal shaft 4 is mounted. This shaft 4 is held in bearings 5 on either side of the housing 1 with slide ring seals (not shown). The housing 1 has an inlet 6 at the top and an outlet 7 at the side. At the lowest point, a sump outlet 8 is provided, which has a stop valve 9. The rotor 3 is provided with a circumferential groove 10, into which the inlet 6 opens and from which the sump outlet 8 leads away. The circumferential faces 11 of the arms 12, 13 laterally defining this circumferential groove 10 form with the inner circumferential face 14 of the housing 1 a respective filter gap 15. Agitator blades 16 mounted on the rotor 3 and distributed evenly over the circumference scrape the inner circumferential face 14 of the housing 1 and prevent dead-flow spaces in the chamber 2. The rotor 3 is provided with holes 17, through which the liquid can flow in order to reach the outlet 7. The circumferential faces 11 of the arms 12, 13 are provided with teeth 18, which extend right up to the inner circumferential face 14. The gaps in the teeth are so large that the solid particles contained in the liquid can pass through, but not coarse components, i.e. the filter gap 15 extends to the circle formed by the base of the teeth 18.

In a simplified embodiment, the arm 13 is omitted and the rotor 3 has no holes.

Figure 3:
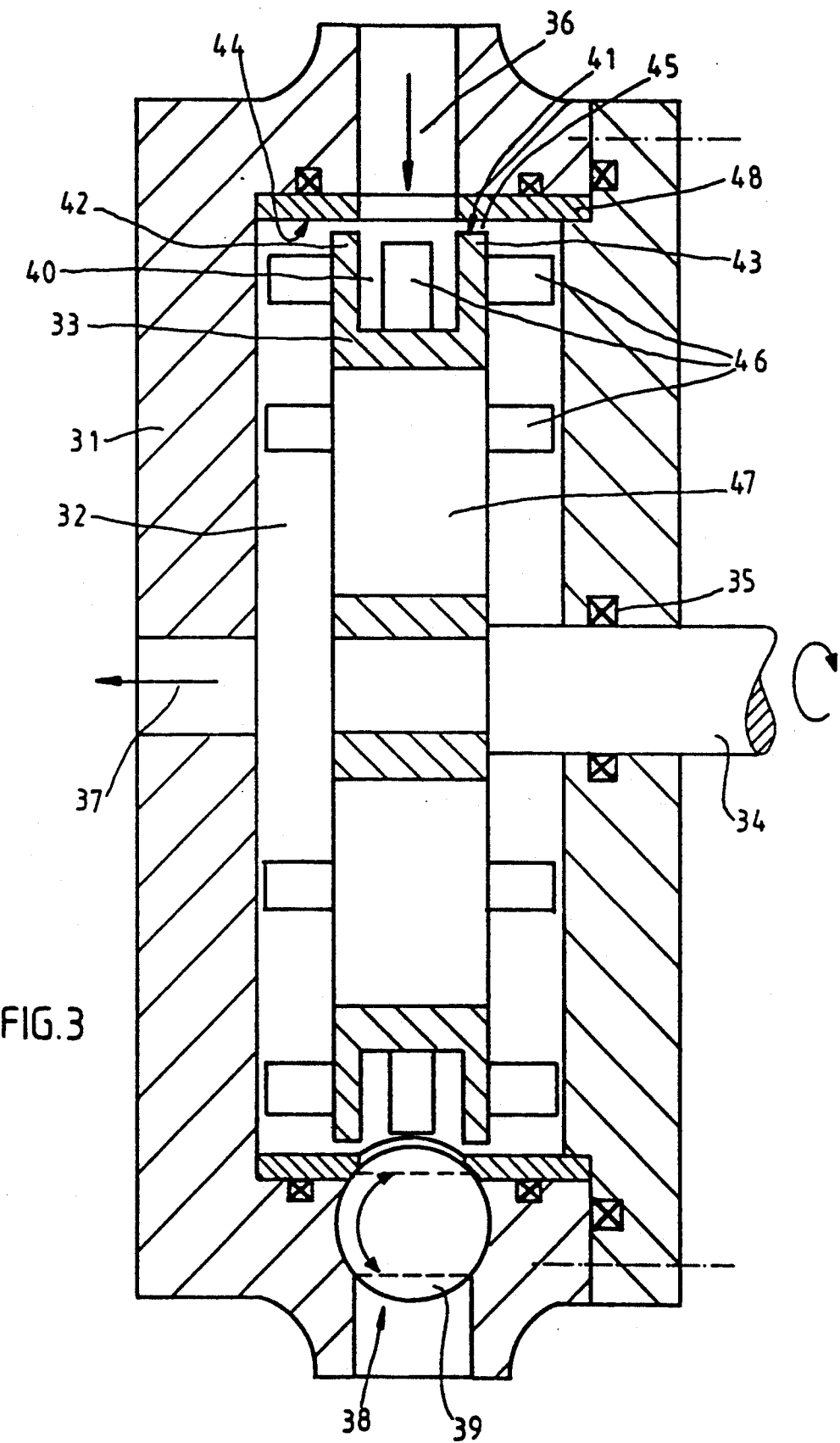
FIG. 3 represents a cross-sectional view of a second embodiment of the device of the present invention.

In FIG. 3, a housing 31 encloses a chamber 32, in which a rotor 33 is mounted with a horizontal shaft 34. This shaft 34 is held on one side in a bearing 35 with a slide ring seal (not shown). The housing 31 has an inlet 36 at the top and a central outlet 37. At the lowest point, a sump outlet 38 is provided, which has a stop valve 39. The rotor 33 is provided with a circumferential groove 40. The circumferential faces 41 of the arms 42, 43 laterally defining this circumferential groove 40 form filter gaps 45 with the inner circumferential face 44 of an exchangeable spacer ring 48 mounted in the housing 31. Agitator blades 46 mounted on the rotor 33 comb through the otherwise dead-flow spaces of the chamber 32. The rotor 33 is provided with holes 47, through which the liquid can flow in order to reach the outlet 37.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A filter device for separating coarse components from liquid components for the manufacture of plastic materials, which contain powdered, fine-grain or fibrous solid particles comprising: a housing having a rotor mounted therein, the circumferential face of said rotor forming a filter gap with the inner circumferential face of said housing, said rotor being equipped with agitator blades which comb through dead-flow spaces of said housing, said housing being provided with an inlet in the region of the inner circumferential face, a sump outlet spaced therefrom and an outlet on the side thereof.

2. The filter device of claim 1, wherein said rotor has a circumferential groove, into which said inlet opens and from which said sump outlet opens out.

3. The filter device of claim 2, wherein said rotor is provided with axial holes.

4. The filter device of claim 1, wherein the circumferential face of said rotor defining the filter gap is provided with teeth.

5. The filter device of claim 1, wherein the shaft of the rotor is mounted horizontally and wherein the inlet is provided at the top and the sump outlet at the bottom of said housing.

6. The filter device of claim 1, wherein the inner circumferential face of said housing is formed by an exchangeable spacer ring.

7. The filter device of claim 1, wherein the agitator blades are formed as exchangeable parts.

8. A filter device for separating coarse components from liquid components which contain powdered, fine-grain or fibrous solid particles comprising:
   a) a housing comprising a hollow chamber defined by a circular base, a circular top, and a cylindrical wall connecting said base and said top, said cylindrical wall having an inside surface, said housing being provided with
      i) an inlet in said cylindrical wall for the introduction of liquid component into said chamber,
      ii) a sump outlet spaced away from said inlet for removal of filtered material from said chamber, and
      iii) an outlet located either in said base or in said top for allowing liquid component to pass through said housing, and
   b) a rotor mounted in said housing, said rotor having an outer circumferential surface which forms a filter gap with said inside surface, and wherein said rotor is provided with agitator blades which comb through any dead-flow spaces within said hollow chamber.

* * * * *